D. H. WHITTEMORE.
Straw Cutter.

No. 35,121.

Patented April 29, 1862.

Inventor
D. H. Whittemore
Worcester
Mass.

UNITED STATES PATENT OFFICE.

D. H. WHITTEMORE, OF WORCESTER, MASSACHUSETTS.

IMPROVEMENT IN STRAW-CUTTERS.

Specification forming part of Letters Patent No. 35,121, dated April 29, 1862.

*To all whom it may concern:*

Be it known that I, D. H. WHITTEMORE, of Worcester, in the county of Worcester and State of Massachusetts, have invented a new and useful Improvement in Straw-Cutters; and I do hereby declare that the following is a full and exact description thereof, reference being had to the accompanying drawings, and to the letters of reference marked thereon.

Figure 1:
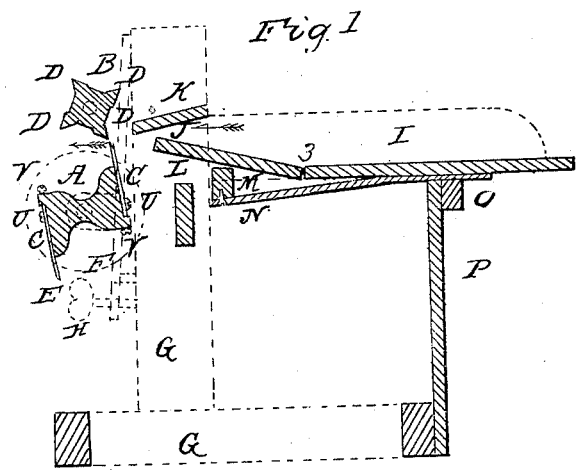
Figure 2:
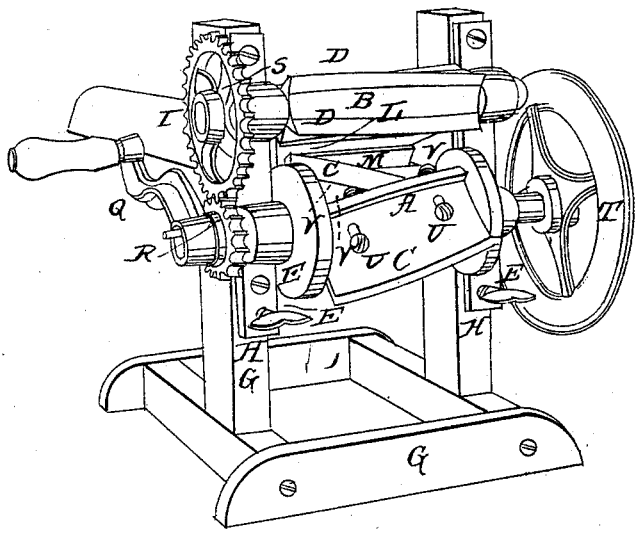

Figure 1 is a side sectional view, and Fig. 2 a perspective view, of the machine complete.

The same letters in each figure refer to the same parts of the machine.

In Fig. 1 the machine is represented as being cut in two near its center lengthwise, showing the relative position of the several parts.

A is the cutting-cylinder, which is geared to the cylinder or arbor B above, and both revolve in the direction of the arrow seen between them, and are so arranged that the edges of the knives C C move faster than the projections D D D D upon the arbor or cylinder B above, and are also so arranged that the edges of the knives C C move past the projections D D D D at some point between the two cylinders and in close proximity to each other, and in such a manner (they both being spiral) that a shear cut is produced upon any straw or other feed that may be between them.

The drawings represent a machine in which the cutting-cylinder A revolves twice to the cylinder B once, and the cylinder A being about twice the size of the cylinder B the edges of the knives C C upon the cylinder A move past the projections D D, &c., upon the cylinder B at about four times the velocity of the former.

The cylinder or arbor B may be properly called a "revolving bed-knife," each corner of the same being the point which the cutting-knives upon the opposite cylinder press the feed against to cut it off. This result may be produced by making the two cylinders move at the same speed if there is a difference in size of the two cylinders; but the projection upon one should correspond with the knives upon the other cylinder; or a similar result would be produced if both were of the same size and one moving at greater speed than the other. If the periphery of one moves faster than that of the other, no matter how the difference in speed is produced, and the projections upon one correspond with the knives upon the other, the same result is produced. I may also make the cylinder B the cutting-cylinder by having the projections D D, &c., of cutting material and by having in place of the knives C C revolving flanges, which shall overtake and press the feed against the edges upon the cylinder B while in revolution, thereby causing it to be cut. The two cylinders thus arranged serve also to feed the straw or other substance that may be placed between them while in motion, as both at the point where the straw comes in contact are moving in the same direction, and the feed is pinched between them and drawn forward until one overtakes the other, and a shear cut is produced and the feed cut.

The arbor B may be made square, cutting against or past its corners, and may be made of wrought-iron or steel. The cutting between the two cylinders may take place between the two centers of the cylinders, or back of them, as in the drawings, or in front of them.

The variation in the place of cutting varies the length of the feed cut, as it takes hold of it in a different place and position at the different points of cutting, but is not readily changed by this means after the machine is manufactured.

I vary the length of the feed in the machine after it is manufactured by the use of the set-screw E and screw F, whereby I move the cylinder A from the wood frame G, and thereby place the two cylinders or centers of them out of a perpendicular line, and consequently alter their relative position with the straw or feed in the hopper. This is done by unscrewing the screw F and screwing up the set-screw E, which moves out the iron frame and with it the cylinder A, which is attached to it. The farther this is moved out the shorter will be the cut, and if it is moved out far enough the cutting will be across the ends of the straw and there will be no motion to draw the feed forward. By this method or arrangement in a full-sized machine I am enabled to cut from one-quarter of an inch to one and one-half inch in length, according to the wish of the operator or the kinds of feed cut, as some need to be cut finer than others. This principle of variation may be applied to other methods of cutting where two cylinders turn together.

In the wood frame G, I is the hopper to hold the feed to be cut. It is drawn into the cutting-cylinder in the direction of the arrow J between the board K and spring-board L. The board L is hinged at or near the point 3 and forms a part of the hopper I, and is pressed up out of line, nearly closing the mouth of the hopper by the block M pressing against it, which block is attached to the spring N, and which spring runs back through the block O and serves to support the hopper upon the standard P. By sliding the spring farther back in the block a stronger pressure is obtained or would be upon any feed in the mouth of the hopper. The object of this spring is to press upon the feed and not allow it to be drawn forward too fast or easily when a short cut is desired, and it gives it an evenness and regularity of feed.

In Fig. 2 the crank Q is seen which puts the machine in motion. This crank may be attached to the arbor B above, which would give an increase of speed, but at a loss of power. In Fig. 2 the gears R and S are seen, which move and regulate the two cylinders together. One of these is of twice the size of the other; but their relative size may be changed if the two cylinders are changed in proportion. These cylinders are both spiral to produce a gradual and shear cut; but the cylinder B is not as much spiral as the cylinder A, because it moves slower, so as to produce the same cut from one end to the other. Otherwise the cylinder A at one end would move away from the projection against which it cuts upon the opposite cylinder at the same end before said projection arrives at the point of cutting, as it is moving slower. They might both be made straight, but a gradual cut would not be produced. In Fig. 2 the set-screws E E are seen, as described by Fig. 1, and are represented as having moved the iron frame to which the two cylinders are attached out from the post, as before described. The balance-wheel T is also seen, and the screws u u, which hold the knife to the cylinder, and the adjusting-screws v v, which serve to adjust the knives to the cylinder or revolving bed-knife above.

By the use of this device a cheap, durable, self-feeding cutter is produced that will cut fine and at the same time allow of variation in the length of the feed, so that it will cut long, if desired, as is the case in some kinds of feed.

There is now no machine, that I am aware of, of what is called "fine" or "short" cut except those which are fed by "feed-rolls," as they are called, and these are necessarily costly and complicated, and none of these allow of variation in the length of the feed cut, except they have a change of gear, and this adds greatly to the expense and labor. This method, when the machine is properly made, will give almost any length of cut desired.

If a short cut alone is desired, I place the cylinder permanently upon the frame, as represented in the drawings—viz., with the bottom cylinder thrown out so that it shall not be in perpendicular line with the one above, and consequently the line of center of the two cylinders not at right angles with the feed lying in the hopper. A similar result would be obtained if the opposite end of the hopper were raised.

Having thus described my improvement, what I claim as my invention, and desire to secure by Letters Patent, is—

1. So arranging two cylinders together that the periphery of one shall move faster than that of the other, and at some point between them the knife or knives upon one shall move past the knife or knives or projections upon the other cylinder in such a manner that both a shear cut and self-feeding operation shall be produced thereby.

2. Arranging two cylinders together in such a manner that their relative position with the feed in the hopper can be changed for the purpose of varying the length of the feed cut, or so placing them upon the frame that the line of center of the two cylinders will not be at right angles with the bottom of the hopper, as represented in the accompanying drawings, for the purpose of producing a short cut, substantially as set forth.

3. Combining with said shear-cutting cylinders the movable mouth-piece L, substantially in the manner and for the purpose set forth.

D. H. WHITTEMORE. [L. S.]

Witnesses:
 FREDC. ALLEN,
 HENRY A. FROST.